United States Patent
Cormican et al.

(10) Patent No.: US 10,477,277 B2
(45) Date of Patent: Nov. 12, 2019

(54) ELECTRONIC PROGRAMMING GUIDE WITH EXPANDING CELLS FOR VIDEO PREVIEW

(71) Applicant: Google Inc., Mountain View, CA (US)

(72) Inventors: Neil P. Cormican, Menlo Park, CA (US); Michael Kleinerman, San Francisco, CA (US); Andrew Poes, Millbrae, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/400,814

(22) Filed: Jan. 6, 2017

(65) Prior Publication Data

US 2018/0199110 A1    Jul. 12, 2018

(51) Int. Cl.
| | |
|---|---|
| *H04N 7/16* | (2011.01) |
| *H04N 21/482* | (2011.01) |
| *H04N 21/81* | (2011.01) |
| *H04N 21/41* | (2011.01) |
| *H04N 21/4722* | (2011.01) |

(Continued)

(52) U.S. Cl.
CPC ....... *H04N 21/4821* (2013.01); *G06F 3/0482* (2013.01); *G06F 3/04817* (2013.01); *G06F 3/04883* (2013.01); *H04N 21/4126* (2013.01); *H04N 21/4722* (2013.01); *H04N 21/482* (2013.01); *H04N 21/816* (2013.01)

(58) Field of Classification Search
CPC .............. H04N 21/482; H04N 21/478; H04N 21/4622; H04N 21/4316; H04N 5/44543; H04N 5/45; H04N 5/46; H04N 5/44591; H04N 5/4401

USPC .............................. 725/37–61; 709/217–232
See application file for complete search history.

(56) References Cited

U.S. PATENT DOCUMENTS

| | | | |
|---|---|---|---|
| 8,539,541 B2 * | 9/2013 | Kim | G06F 3/04847 725/133 |
| 8,589,495 B1 * | 11/2013 | Beckert | G06F 9/542 709/204 |

(Continued)

FOREIGN PATENT DOCUMENTS

| | | |
|---|---|---|
| EP | 2654314 | 10/2013 |
| EP | 2739038 | 6/2014 |

(Continued)

OTHER PUBLICATIONS

"International Search Report and Written Opinion", PCT Application No. PCT/US2017/057670, dated Apr. 16, 2018, 15 pages.

(Continued)

*Primary Examiner* — Annan Q Shang
(74) *Attorney, Agent, or Firm* — Colby Nipper PLLC

(57) ABSTRACT

This document describes methodologies for an electronic programming guide with expanding cells for video preview. These techniques and apparatuses enable improved navigation for video and channel previewing based on gestures performed on a mobile device acting as a remote control to a remote display device. These techniques and apparatuses allow video preview of current program content over many channels with a simple and easy method to preview different channels. Further, these techniques and apparatuses can also be applied to view information regarding upcoming programs scheduled at a future time.

20 Claims, 12 Drawing Sheets

(51) Int. Cl.
*G06F 3/0482* (2013.01)
*G06F 3/0488* (2013.01)
*G06F 3/0481* (2013.01)

(56) References Cited

U.S. PATENT DOCUMENTS

| | | | |
|---|---|---|---|
| 9,210,361 B2* | 12/2015 | Todd | H04N 5/45 |
| 9,582,157 B1* | 2/2017 | Chatterjee | G06F 17/30781 |
| 2003/0126605 A1 | 7/2003 | Betz et al. | |
| 2009/0019488 A1* | 1/2009 | Ruiz-Velasco | G06F 3/0482 |
| | | | 725/43 |
| 2009/0055011 A1* | 2/2009 | Leu | G06F 17/50 |
| | | | 700/110 |
| 2010/0037261 A1* | 2/2010 | Ohta | G06F 3/017 |
| | | | 725/40 |
| 2011/0037851 A1* | 2/2011 | Kim | G06F 3/04847 |
| | | | 348/143 |
| 2011/0209056 A1* | 8/2011 | Choudhary | G06F 9/451 |
| | | | 715/702 |
| 2011/0249073 A1* | 10/2011 | Cranfill | H04N 7/147 |
| | | | 348/14.02 |
| 2012/0047156 A1* | 2/2012 | Jarvinen | G06F 17/30023 |
| | | | 707/758 |
| 2012/0062471 A1 | 3/2012 | Poulidis et al. | |
| 2012/0079416 A1* | 3/2012 | Fagans | G06F 3/04845 |
| | | | 715/781 |
| 2012/0079429 A1* | 3/2012 | Stathacopoulos | H04N 5/44543 |
| | | | 715/830 |
| 2012/0284753 A1* | 11/2012 | Roberts | H04N 21/41407 |
| | | | 725/45 |
| 2012/0291073 A1* | 11/2012 | Friedman | H04N 5/44582 |
| | | | 725/62 |
| 2013/0251273 A1* | 9/2013 | Westphal | G06K 9/6201 |
| | | | 382/218 |
| 2013/0290515 A1* | 10/2013 | Pemrick | G06F 17/3089 |
| | | | 709/224 |
| 2013/0298159 A1* | 11/2013 | You | H04N 21/478 |
| | | | 725/34 |
| 2014/0089849 A1* | 3/2014 | Choi | G06F 3/017 |
| | | | 715/810 |
| 2014/0184530 A1* | 7/2014 | Hyun | G06F 1/1626 |
| | | | 345/173 |
| 2014/0267094 A1* | 9/2014 | Hwang | G06F 3/0488 |
| | | | 345/173 |
| 2014/0325567 A1* | 10/2014 | Mangat | H04N 21/482 |
| | | | 725/47 |
| 2015/0054784 A1* | 2/2015 | Kim | G06F 3/0416 |
| | | | 345/174 |
| 2015/0100885 A1* | 4/2015 | Riley | H04M 1/72519 |
| | | | 715/720 |
| 2015/0195620 A1* | 7/2015 | Buchner | H04N 21/4788 |
| | | | 725/141 |
| 2015/0234545 A1* | 8/2015 | Churchill | G06F 3/0482 |
| | | | 715/767 |
| 2015/0309687 A1* | 10/2015 | Herigstad | H04N 21/4126 |
| | | | 715/784 |
| 2015/0339026 A1* | 11/2015 | Phang | H04N 21/42208 |
| | | | 348/552 |
| 2016/0191837 A1* | 6/2016 | Huh | H04N 5/4403 |
| | | | 348/564 |
| 2016/0364091 A1* | 12/2016 | Bernstein | G06F 3/03545 |

FOREIGN PATENT DOCUMENTS

| | | |
|---|---|---|
| WO | 2014168528 | 10/2014 |
| WO | 20180128666 | 7/2018 |

OTHER PUBLICATIONS

"Invitation to Pay Additional Fees and Partial Search Report", PCT Application No. PCT/US2017/057670, dated Feb. 26, 2018, 9 pages.

"International Preliminary Report on Patentability", PCT Application No. PCT/US2017/057670, dated Jul. 18, 2019, 10 pages.

* cited by examiner

1100 ─╮

```
┌─────────────────────────────────────────────────────────┐
│ Display a TV programming guide that includes a plurality of cells │
│ representing TV programs currently being provided via TV channels │
│ and a preview region configured to display media content associated │
│ with a first TV program being currently provided via a first channel │
│                          1102                           │
└─────────────────────────────────────────────────────────┘
                              │
                              ▼
┌─────────────────────────────────────────────────────────┐
│     Recognize a drag gesture made over the plurality of cells     │
│                          1104                           │
└─────────────────────────────────────────────────────────┘
                              │
                              ▼
┌─────────────────────────────────────────────────────────┐
│  In response to recognizing the drag gesture, shift the plurality of │
│ cells along a horizontal axis of the list of cells in a horizontal direction │
│        corresponding to a horizontal component of the drag gesture       │
│                          1106                           │
└─────────────────────────────────────────────────────────┘
                              │
                              ▼
┌─────────────────────────────────────────────────────────┐
│ In response to the plurality of cells being shifted, display a column │
│  of cells representing upcoming programs that are scheduled for a   │
│   future time on the channels represented by the plurality of cells  │
│                          1108                           │
└─────────────────────────────────────────────────────────┘
                              │
                              ▼
┌─────────────────────────────────────────────────────────┐
│      In response to receiving an interrupt during the drag       │
│         gesture, return the plurality of cells to respective        │
│       positions of the plurality of cells prior to being shifted      │
│                          1110                           │
└─────────────────────────────────────────────────────────┘
```

FIG. 11

ELECTRONIC PROGRAMMING GUIDE WITH EXPANDING CELLS FOR VIDEO PREVIEW

BACKGROUND

Conventional television programming guides are structured as a matrix of time versus channels. Generally, users understand that a list of channels from top to bottom are specific channels included in their subscription package, and time from left to right includes television (TV) programs being provided now and at future scheduled times on each of the specific channels. Using a remote control, users can jump between those channels, navigating up and down to read descriptions associated with currently aired programs, or navigating right and left to move forward or back in time to read descriptions associated with upcoming TV programs or previously aired TV programs. This particular structure was designed specifically for TV displays because TV has a restricted navigation. For example, users can only navigate the programming guide in two directions: up/down and left/right.

This background description is provided for the purpose of generally presenting the context of the disclosure. Unless otherwise indicated herein, material described in this section is neither expressly nor impliedly admitted to be prior art to the present disclosure or the appended claims.

BRIEF DESCRIPTION OF THE DRAWINGS

Apparatuses of and techniques using methodologies for an electronic programming guide (EPG) with expanding cells for video preview are described with reference to the following drawings. The same numbers are used throughout the drawings to reference like features and components:

FIG. 11 illustrates example methods of viewing upcoming programs via an EPG with expanding cells for video preview.

DETAILED DESCRIPTION

Overview

Figure 1:
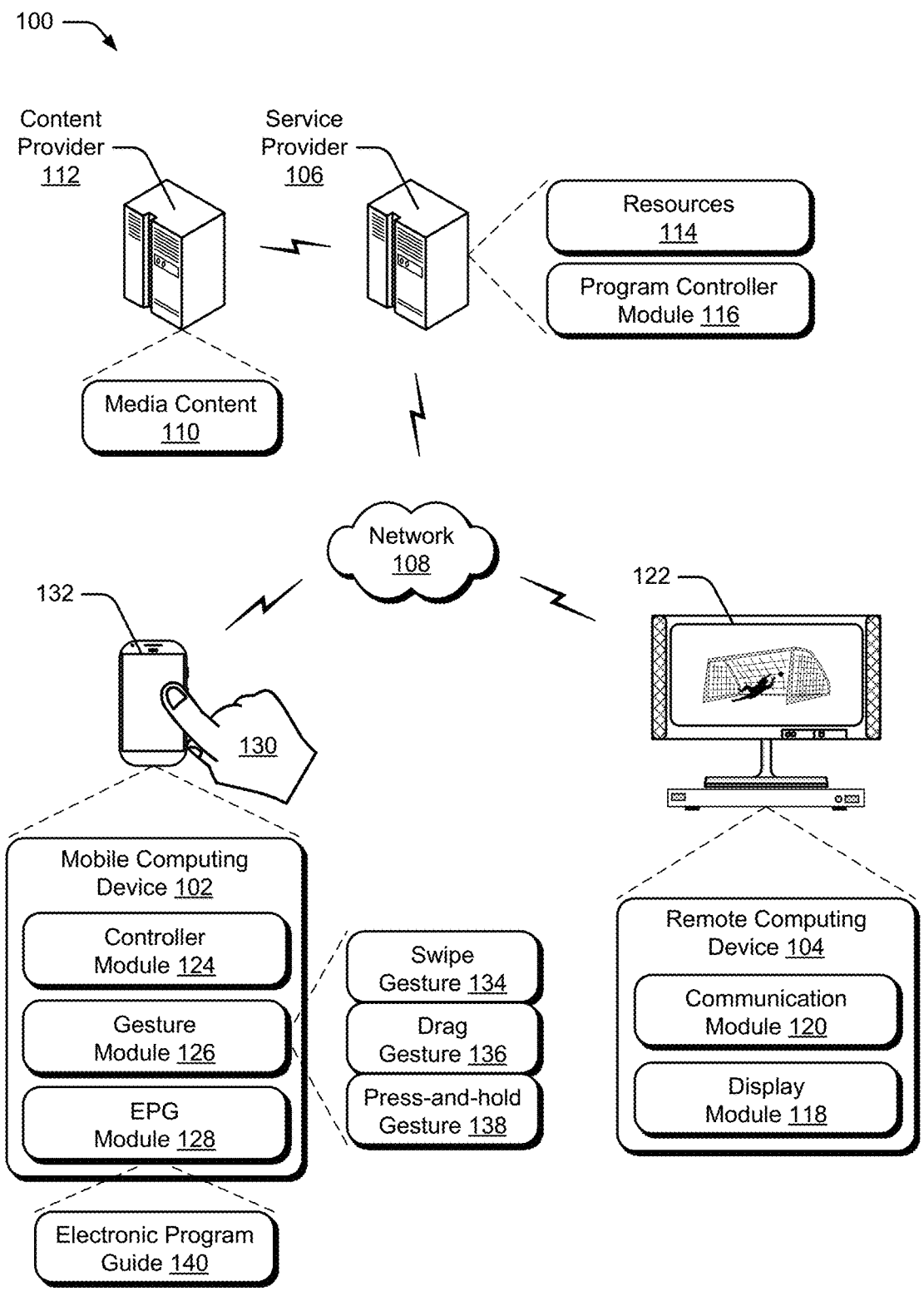
FIG. 1 illustrates an example environment in which methodologies for an EPG with expanding cells for video preview can be embodied.

Conventional techniques that allow users to navigate TV channels using a remote control are inefficient at least because traditional programming guides are specifically designed for televisions with large display areas and landscape orientations. This particular structure is not suitable to use on a mobile device due to limited display area and size, as well as its conventionally landscape-oriented structure. For instance, using conventional landscape-orientated TV programming guides in the portrait layout of the mobile device requires a substantial amount of scrolling inputs, which can be tiresome and frustrating for users.

This document describes methodologies for an electronic programming guide (EPG) with expanding cells for video preview. These techniques and apparatuses enable improved navigation for video and channel previewing based on gestures performed on a mobile device acting as a remote control to a remote display device. These techniques and apparatuses allow video preview of current program content over many channels with a simple and easy method to preview different channels. Further, these techniques and apparatuses can also be applied to view information regarding upcoming programs scheduled at a future time.

In at least one implementation, techniques and apparatuses are described for navigating an EPG via a mobile computing device. A swipe gesture made over a list of cells is recognized. Each cell in the list of cells represents a media channel (e.g., television channel, live streaming channel over a network such as the Internet, an audio channel, and so on) or a media program (e.g., television program, live streaming video, audio broadcast, audio streaming, and so on). In response to recognizing the swipe gesture, the cells are moved along the longitudinal axis in a longitudinal direction corresponding to a longitudinal component of the swipe gesture. For instance, if the user swipes upward, the list of cells also moves up. A top cell of the list is shifted into a preview region located proximate to the list. The preview region is configured to display media content associated with a currently selected channel or program. For example, as the top cell shifts into the preview region, an image is displayed that represents a current program airing on a channel represented by the shifted top cell. Visually, the top cell appears to expand and transition into the image as the top cell moves into the preview region, which as a relatively larger area than the top cell. Then, after a predefined duration of time, the image displayed in the preview region is replaced with real time video of the current program to enable a user to preview program content playing on that channel. Using these techniques, the user can preview current program content on a variety of different channels via the mobile computing device.

In one or more implementations, a press-and-hold gesture is recognized that contacts a surface of the mobile computing device at an initial touch location and maintains contact with the surface at the initial touch location for at least a predefined duration of time. Based on the press-and-hold gesture proximate to a channel logo displayed within one of the cells, scrolling mode is initiated and objects displayed within the cells shift to one side to reduce the chances of the objects being obscured by the user's finger that performs the press-and-hold gesture. Then, a drag gesture is recognized during the scrolling mode that moves the initial touch location of the press-and-hold gesture along a longitudinal axis of the list of cells to a new touch location. In response to recognizing the drag gesture, the list of cells is scrolled in a longitudinal direction along the longitudinal axis of the list to enable selection of a channel in the list of cells that was not included in the displayed portion of the EPG. This enables a user to quickly and easily scroll through a large number of channels. When the user releases his finger from the surface, the objects shift back to their original positions within the cells and one cell is selected to be transitioned into the preview region for display of an image associated with a program represented by the selected cell.

In at least one implementation, a drag gesture is recognized over the list of cells. Based on the drag gesture, the cells are shifted along a horizontal axis of the list of cells in a horizontal direction corresponding to a horizontal component of the drag gesture and a column of new cells is displayed that represents upcoming programs scheduled for a future time on the channels represented by the shifted cells. Subsequently, if an interrupt is received during the drag gesture, the cells are returned to their respective x-axis positions at which the cells were located prior to being shifted.

As used herein, the term "press-and-hold" (also referred to as "long-press") may refer to a user input that is a continuous input over a duration of time. For instance, a user may initiate contact with a touchscreen surface, such as by touching or pressing the surface with a finger or other input item at a particular location on the touchscreen surface, and maintain such contact over a period of time (e.g., 0.25, 0.5, 1.0, 1.5 seconds, and so on). Once the contact has been held for a predefined period of time, an operation mapped to the press-and-hold input is initiated. Accordingly, the term press-and-hold represents a continuous touch input over a suitable duration of time and without interruption.

As used herein, the term "drag" may refer to an act or instance of moving an input item across a touchscreen to activate a function, where a speed of the movement of the input item is below a threshold value. In contrast, the term "swipe" may refer to an act or instance of moving an input item across a touchscreen to activate a function, where the speed of the movement of the input item is above a threshold value. A swipe motion is essentially a quick drag motion, such as a fling. Accordingly, a drag input is a relatively slow movement of the input item across the touchscreen to activate a function, whereas a swipe input is a relatively quick movement of the input item across the touchscreen to activate a different function.

The following discussion first describes an operating environment, followed by techniques and procedures that may be employed in this environment. This discussion continues with an example electronic device in which methodologies for an electronic programming guide with expanding cells for video preview can be embodied.

Example Environment

FIG. 1 illustrates an example environment 100 in which methodologies for an EPG with expanding cells for video preview can be embodied. The example environment 100 includes examples of a mobile computing device 102, a remote computing device 104, and a service provider 106 communicatively coupled via a network 108. Functionality represented by the service provider 106 may be performed by a single entity, may be divided across other entities that are communicatively coupled via the network 108, or any combination thereof. Thus, the functionality represented by the service provider 106 can be performed by any of a variety of entities, including a cloud-based service, an enterprise hosted server, or any other suitable entity.

Computing devices that are used to implement the service provider 106, the mobile computing device 102, or the remote computing device 104 may be configured in a variety of ways. Computing devices, for example, may be configured as a desktop computer, a laptop computer, a mobile device (e.g., assuming a handheld configuration such as a tablet or mobile phone), and so forth. Additionally, a computing device may be representative of a plurality of different devices, such as multiple servers of the service provider 106 utilized by a business to perform operations "over the cloud" as further described in relation to FIG. 11.

The service provider 106 is representative of functionality to distribute media content 110 obtained from one or more content providers 112. Generally speaking, the service provider 106 is configured to make various resources 114 available over the network 108 to clients. In the illustrated example, the resources 114 can include program content that has been processed by a program controller module 116. In some implementations, the program controller module 116 can authenticate a user to access a user account that is associated with permissions for accessing corresponding resources, such as particular television stations or channels, from a provider. The authentication can be performed using credentials (e.g., user name and password) before access is granted to the user account and corresponding resources 114. Other resources 114 may be available without authentication or account-based access. The resources 114 can include any suitable combination of services and/or content typically made available over a network by one or more providers. Some examples of services include, but are not limited to: a content publisher service that distributes content, such as streaming videos and the like, to various computing devices, an advertising server service that provides advertisements to be used in connection with distributed content, and so forth. Content may include various combinations of assets, video comprising part of an asset, advertisements, audio, multimedia streams, animations, images, television program content such as television content streams, applications, device applications, and the like.

The content provider 112 provides the media content 110 that can be processed by the service provider 106 and subsequently distributed to and consumed by end users of computing devices, such as remote computing device 104 and mobile computing device 102. Media content 110 provided by the content provider 112 can include streaming media via one or more channels, such as one or more television programs, on demand videos, movies, and so on.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be representative of multiple networks. Further, the mobile computing device 102 can communicate with the remote computing device 104 via a short range network, such as Bluetooth™, infrared (IR), near field communication (NFC), radio frequency (RF), and so on. Alternatively, the mobile computing device 102 can communicate with the service provider 106 via a cellular network while the service provider 106 communicates with the remote computing device 104 via a different network, such as cable, satellite, digital satellite, digital terrestrial television network, and so on. Thus, a variety of different networks 108 can be utilized to implement the techniques described herein.

The remote computing device 104 is illustrated as including a display module 118 and a communication module 120.

The display module 118 is configured to utilize a renderer to display media content via a display device 122. The communication module 120 receives the media content 110 from the service provider 106, and processes the media content 110 for display. The communication module 120 is configured to communicate with the service provider 106 to request particular resources 114 and/or media content 110.

The mobile computing device 102 includes a controller module 124, a gesture module 126, and an EPG module 128. The controller module 124 is representative of functionality, and constitutes but one means, that generates control commands to the remote computing device 104 to control output of content via the display device 122. For example, the controller module 124 enables the mobile computing device 102 to be used as a remote controller to control operations of the remote computing device 104, such as channel selection, channel preview, volume control, power on/off, and so on. Accordingly, the controller module 124 represents functionality to control a variety of operations associated with output of content via the display device 122.

The gesture module 126 is representative of functionality, and constitutes but one means, that identifies gestures and causes operations to be performed that correspond to the gestures. The gestures may be identified by the gesture module 126 in a variety of ways. For example, the gesture module 126 can be configured to recognize a touch input, such as a finger of a user's hand 130 as proximate, or in contact with, a gesture-sensitive surface of a display device 132 of the mobile computing device 102 using touchscreen functionality. Other input items can also be used to generate the touch input, such as a stylus.

The touch input may also be recognized as including attributes (e.g., selection point, movement, etc.) that are usable to differentiate the touch input from other touch inputs recognized by the gesture module 126. This differentiation may then serve as a basis to identify a gesture from the other touch inputs, and consequently initiate an operation mapped to the gesture. A variety of different types of gestures may be recognized by the gesture module 126, such as gestures that are recognized from a single type of input (e.g., touch gestures that include an interrupt, such as the user's finger lifting off of the display device 132) as well as gestures involving multiple types of inputs.

For example, in at least one aspect described herein, the mobile computing device 102 may be configured to detect and differentiate between multiple different gestures without an interrupt between gestures. From the user's perspective, an input item (e.g., the user's finger) may maintain continuous contact with the display device 132 while inputting multiple different gestures to execute multiple different operations. Accordingly, multiple different gestures can be recognized as a continuous touch input without interruption.

Accordingly, the gesture module 104 may support a variety of different gestures. Examples of gestures described herein include a swipe gesture 134, a drag gesture 136, and a press-and-hold gesture 138. Each of these gestures is described in further detail below.

The EPG module 128 is representative of functionality, and constitutes but one means, that presents an electronic programming guide 140 (EPG) for display via the display device 132 of the mobile computing device 102 and enables a user to navigate media channels or providers included in the EPG 140. The EPG 140 lists current media programs that are currently airing on each channel, as well as scheduled programs that may be available at particular times in the future. In addition, the EPG 140 includes metadata describing each program, such as a title, a brief summary of the program, a starting time, a run time, actors' names, and so on. The EPG module 128 presents the EPG 140 in a way that provides simple navigation through the EPG 140 via a small-screen device, such as the mobile computing device 102, and/or via a different layout than the conventional landscape layout.

Figure 2:
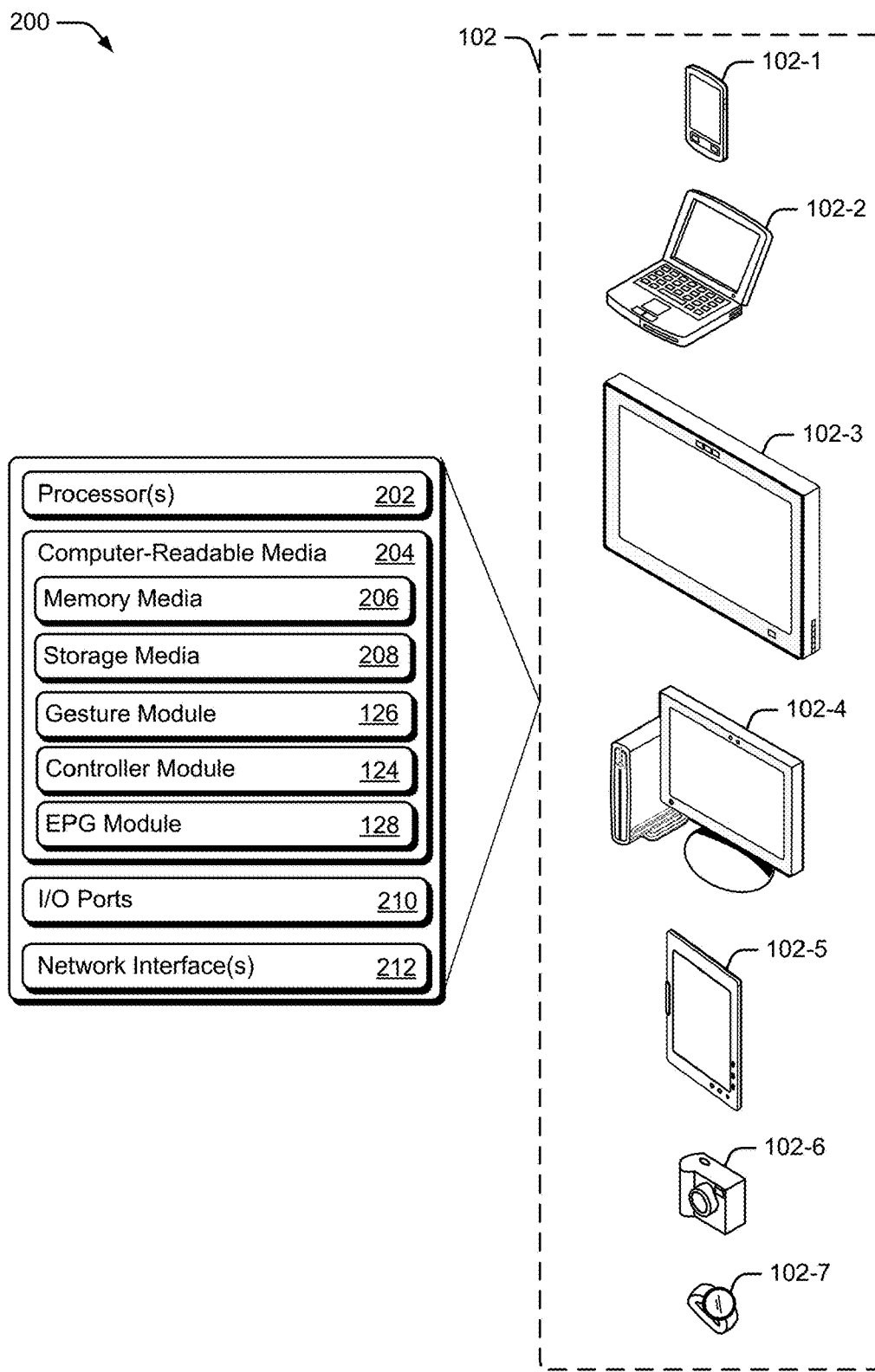
FIG. 2 illustrates an example implementation of a mobile computing device of FIG. 1 in greater detail.

Having generally described an environment in which methodologies for an EPG with expanding cells for video preview may be implemented, this discussion now turns to FIG. 2, which illustrates an example implementation 200 of the mobile computing device 102 of FIG. 1 in greater detail in accordance with one or more aspects. The mobile computing device 102 is illustrated with various non-limiting example devices: smartphone 102-1, laptop 102-2, television 102-3, desktop 102-4, tablet 102-5, camera 102-6, and smartwatch 102-7. The mobile computing device 102 includes processor(s) 202 and computer-readable media 204, which includes memory media 206 and storage media 208. Applications and/or an operating system (not shown) embodied as computer-readable instructions on the computer-readable media 204 can be executed by the processor(s) 202 to provide some or all of the functionalities described herein, as can partially or purely hardware or firmware implementations. The computer-readable media 204 also includes the gesture module 126, which can recognize user input as one or more gestures, such as the swipe gesture 134, the drag gesture 136, or the press-and-hold gesture 138, that are mapped to particular operations to be initiated.

The mobile computing device 102 also includes I/O ports 210 and network interfaces 212. I/O ports 210 can include a variety of ports, such as by way of example and not limitation, high-definition multimedia (HDMI), digital video interface (DVI), display port, fiber-optic or light-based, audio ports (e.g., analog, optical, or digital), USB ports, serial advanced technology attachment (SATA) ports, peripheral component interconnect (PCI) express based ports or card slots, serial ports, parallel ports, or other legacy ports. The mobile computing device 102 may also include the network interface(s) 212 for communicating data over wired, wireless, or optical networks. By way of example and not limitation, the network interface 212 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

Figure 3:
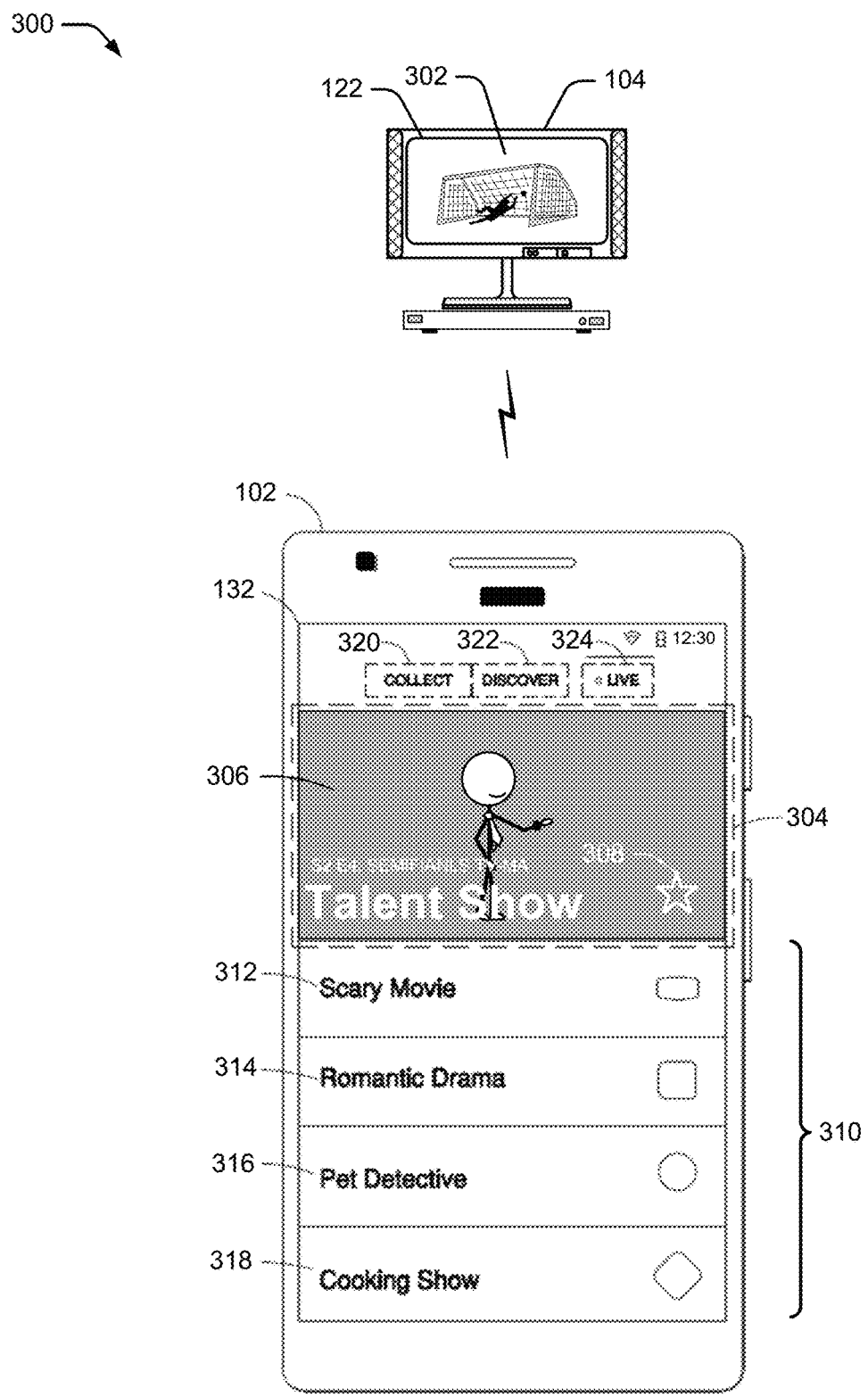
FIG. 3 illustrates an example implementation of an EPG with expanding cells for video preview.

Having described the mobile computing device 102 of FIG. 2 in greater detail, this discussion now turns to FIG. 3, which illustrates an example implementation 300 of a user interface for an EPG with expanding cells for video preview in accordance with one or more implementations. The EPG module 128 from FIG. 2 provides functionality, via the mobile computing device 102, to browse through and preview different programs or channels without causing a change to a current program being presented via the remote computing device 104.

In the example implementation 300, the remote computing device 104 is presenting a soccer game 302 currently being broadcast on a particular television channel. The mobile computing device 102 (acting as remote controller for the remote computing device 104) is configured to present, via the display device 132, a preview region 304 for displaying media content associated with a program. In the illustrated example, an image 306 of a Talent Show television program, provided via a first channel represented by channel logo 308, is presented via the preview region 304 of the display device 132. Below the preview region 304 is a list of cells 310, with each cell representing a channel, a program, a provider, or a combination thereof. The cells represent programs and channels other than what is shown in the preview region 304. For example, a first program can be represented in the preview region 304 while the list of cells includes other programs that are different than the first program and which hare being aired on different channels. Because of limited display area of a small-screen device, this structure reduces redundant information that may consume valuable display area.

The list of cells includes current programs that are currently being aired (e.g., streamed, broadcast, provided) via corresponding channels. In this way, the user can see what is "on" right now. In the illustrated example, current programs include Scary Movie 312 provided via a second channel, Romantic Drama 314 provided via a third channel, Pet Detective 316 provided by a fourth channel, and Cooking Show 318 provided by a fifth channel. Each of the additional programs are listed with logos of corresponding channels. Alternatively, each program can be listed with corresponding channel numbers rather than logos. Accordingly, any suitable visual indicia can be utilized to inform the user of which channel is airing the corresponding program.

The EPG 140 can be presented in a portrait layout to correspond with an orientation of a mobile device, such as a smartphone, being held by the user in a portrait orientation. However, the EPG 140 can alternatively be presented in a landscape layout if the mobile computing device 102 is held in a landscape orientation. In at least one implementation, the listed programs are selectable for channel preview and/or channel selection, examples of which are described in detail with respect to FIGS. 4-8.

In addition, the EPG 140 can include one or more tabs that are usable to filter displayed content or navigate to different areas of the user interface. In the illustrated example, the user interface includes three example tabs: a collect 322 tab, a discover 324 tab, and a live 326 tab. The collect 322 tab is selectable to display a library of content, such as locally stored videos, user-owned videos stored in cloud-based storage, and so on. The discover 324 tab is selectable to display content that is recommended to the user. Any suitable recommendation engine may be utilized to recommend media content to the user. The live 326 tab is selectable to display live content, such as the programs that are currently being provided on a variety of channels.

Figure 4:
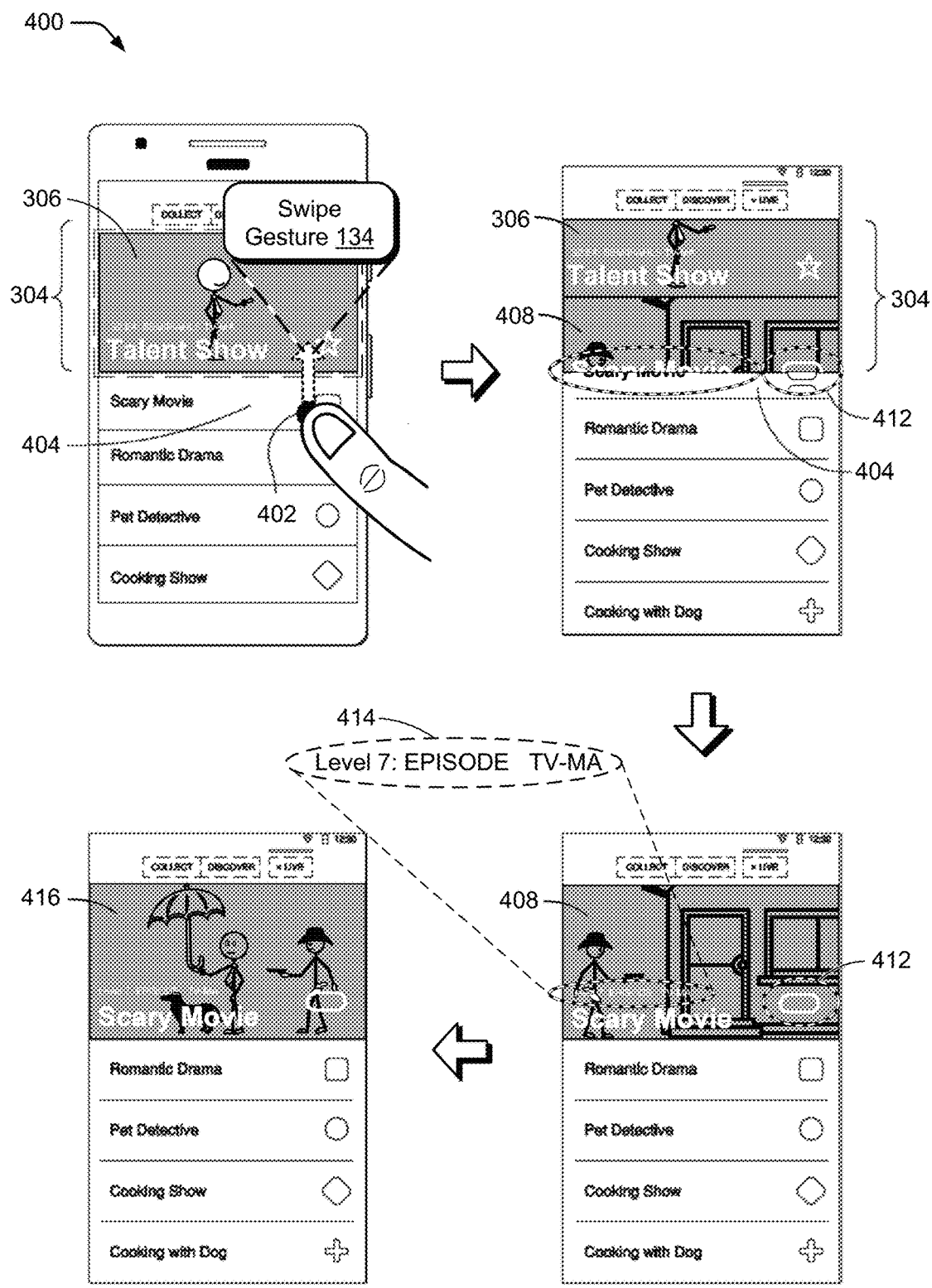
FIG. 4 illustrates an example implementation of navigating an EPG with expanding cells for video preview.

FIG. 4 illustrates an example implementation 400 of navigating an EPG with expanding cells for video preview in accordance with one or more aspects. Continuing with the example described above with respect to FIG. 3, the mobile computing device 102 displays a portion of the EPG 140. To navigate through the different channels, the user can swipe the surface of the display device 132 in a direction toward the preview region 304. For example, the user may touch the surface of the display device 132 at location 402 and slide his finger along the surface toward the preview region 304. The finger may slide along a longitudinal axis of the list. For instance, the user's finger may slide upwards in a direction that is approximately parallel to the longitudinal axis of the list. In one or more aspects, the user may slide his finger in a direction that is less than a threshold angle offset from the longitudinal axis, to allow a margin of error to the user's action. The mobile computing device 102 interprets this user input as a swipe gesture 134 made over the list of cells. Based on the swipe gesture, the cells in the list are moved in a longitudinal direction of the longitudinal axis of the list toward the preview region 304. The list of cells can be moved in a fluid motion corresponding to the sliding of the user's finger. In implementations, a top cell 404 in a list of cells visually appears to move into or behind the preview region 304. Alternatively, the list of cells can move away from the preview region 304, such as in a downward longitudinal direction corresponding to the longitudinal axis of the list. Although the example herein is described in relation to a swipe gesture, alternative gestures can be utilized, such as a drag gesture, a tap gesture, a slide gesture, and so on, to perform similar functionalities.

As the top cell 404 is moved into or behind the preview region, an image corresponding to a program represented by the top cell is revealed in the preview region 304. For example, image 306 associated with the Talent Show begins to leave the preview region 304 and an image 408 associated with the program Scary Movie is revealed as the top cell 404 moves from the list to the preview region. In this way, the images are parallaxing as they move (e.g., slide) from the bottom to the top of the preview region, and the image leaving reveals the image below it. For instance, as a current image slides up, a next image slides into place, being revealed. In implementations, the images 306, 408 can slide in and out of the preview region in the direction of a longitudinal component of the swipe gesture 134, which provides the user with visual feedback corresponding to the movement of the user's finger. In addition, the title 410 of the program Scary Movie and a corresponding channel logo 412 are masked from color to white when entering the preview region 304. In at least some implementations, at least one the title 410 or the channel logo 412 is also enlarged when transitioning into the preview region 304. Thus, the title 410 and the channel logo 412 are masked over the image 408 as semitransparent masks to enable the user to view the image 408 beneath the mask. Additional metadata associated with the program can also be included in the mask, such as an episode title, an episode number, actors' names, a starting time, and so on. In the illustrated example, additional text 414 indicating an episode title and a rating for the episode is also masked over the image 408. Accordingly, any suitable metadata can be included in the mask or in an additional mask over the image of the program displayed in the preview region 304.

After a predefined duration of time (e.g., 0.1, 0.25, 0.5, 1.0, 1.5 seconds, and so on), the image 408 fades to video 416 of the current program. The video 416 is actual video of the current program as it is being provided in real time. Playing the real-time video of the current program enables the user to view what is currently airing on that channel. If the user chooses to continue viewing this program, the user can select the preview region, such as by tapping, double-tapping, multi-finger touching or tapping, and so on, to open a local player on the mobile computing device 102 to play the program with full resolution video and/or audio.

Alternatively, if the mobile computing device 102 is communicatively connected to a cast device, such as the remote computing device 104, the user can select the preview region to cast the program to the remote computing device 104 to cause the remote computing device 104 to play the program. For example, tapping on the video 416 of the program Scary Movie in the preview region 304 of the display device 132, can initiate transmission of a control command to the remote computing device 104 to cause the remote computing device 104 to tune to the channel airing that particular program. The user can swipe the list of cells again to navigate the EPG 140 on the mobile computing device 102 to another channel and view a current program on that other channel In this way, the user can browse current programs without interrupting a current program being displayed at the remote computing device 104, and can also cause the remote computing device 104 to change channels to whichever channel the user is previewing via the mobile computing device 102.

Figure 5:
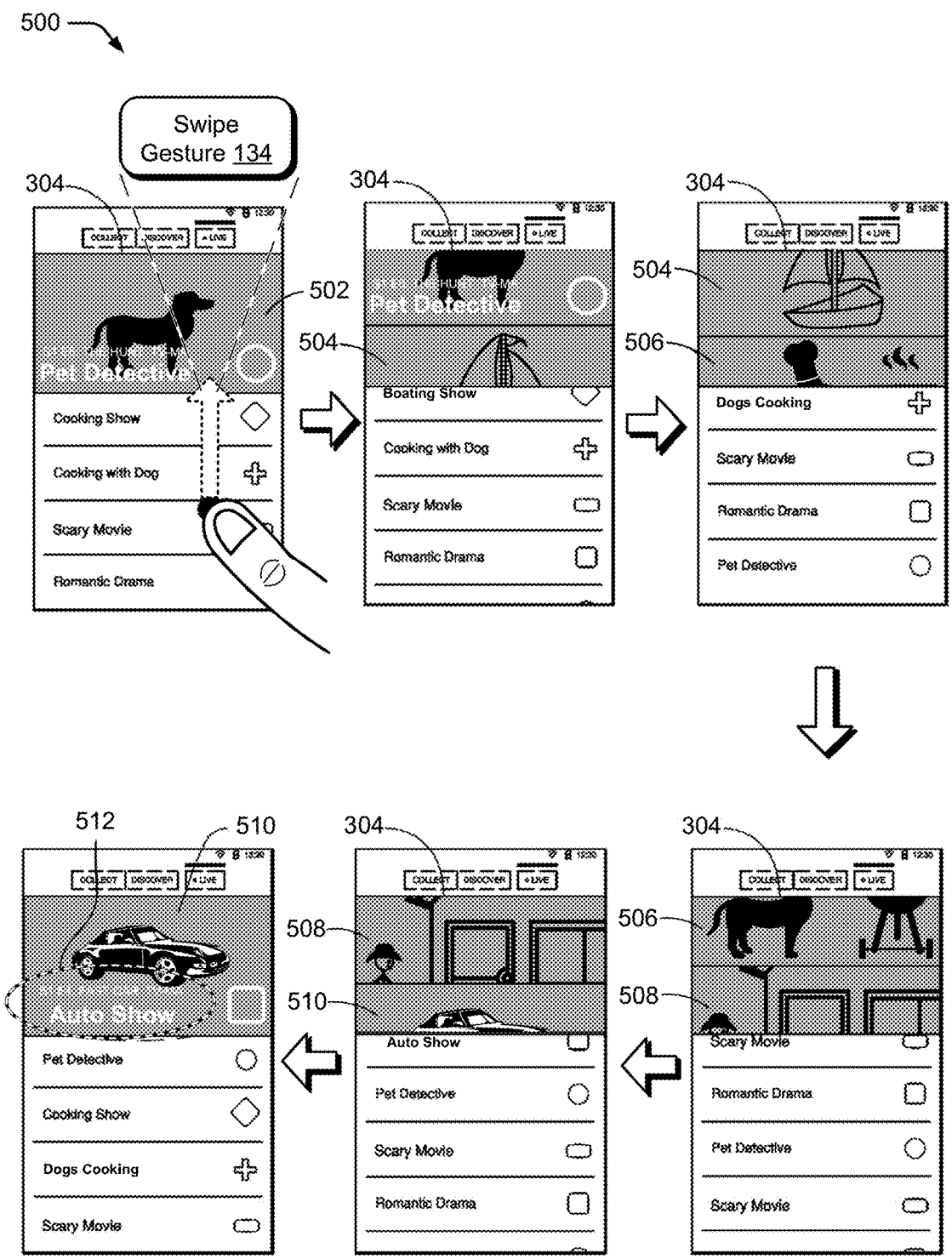
FIG. 5 illustrates an example implementation of a navigating multiple channels via an EPG with expanding cells for video preview.

FIG. 5 illustrates an example implementation 500 of navigating multiple channels via an EPG with expanding cells for video preview in accordance with one or more aspects. For example, a user may perform a swipe gesture 134 with relatively high velocity to scroll several channels at once. In implementations, the velocity of the swipe gesture 134 can be detected as being above a threshold value, which indicates that the user is intending to scroll multiple channels and wishes to view another portion of the EPG. If the swipe gesture 134 is performed in a direction toward the preview region 304, the list of cells moves along the longitudinal axis of the list toward the preview region 304. Further, each cell that moves into or behind the preview region 304 visually transitions into an image associated with a program represented by that particular cell, as described above with respect to FIG. 4. In at least some implementations, however, the images slide from bottom to top of the preview region 304 without masks of the titles, channel logos, or other metadata. This enables the images to quickly pass by without having to process masks for information that may pass by too quickly for the user to read. The movement (e.g., sliding) of the list of cells then begins to slow, and when the movement of the cells reaches a predefined speed, then the mask can be generated and displayed over the image associated with the program to display a corresponding title, channel logo, and/or other metadata for the program.

In the illustrated example, a swipe gesture 134 is received that includes a velocity above a predefined threshold value. Consequently, a video 502 of the program Pet Detective slides up, revealing an image 504 of Boating Show, which is the next program in the list of cells. Rather than stopping at the Boating Show, the movement of the list of cells continues in a fluid motion, and the image 504 of the Boating Show continues to slide up, revealing an image 506 of Dogs Cooking. Notice that because the user interface is quickly scrolling past these programs, no mask is created for their associated titles or channel logos. The movement of the list of cells continues by revealing an image 508 of Scary Movie, but begins to slow down as the image 508 of Scary Movie leaves the preview region 304 and reveals an image 510 of Auto Show. Here, because the speed of the scrolling of the list of cells slowed and eventually stopped on the Auto Show, a mask 512 is created for the title, channel logo, and additional metadata describing this particular program. The mask 512 allows the user to understand which program is being represented in the preview region 304. Then, as described above, the image 510 displayed in the preview region 304 transitions into real-time video of the program as it is currently being played on that channel.

The user may scroll the list of cells until reaching the bottom of the list. In at least one implementation, a navigation instrumentality (e.g., selectable button, icon, image, and so on) can be displayed to enable navigation directly to the top of the list of cells. This navigation instrumentality allows the user to easily and quickly return to the top of the list after reaching the bottom of the list. Alternatively, the list can automatically repeat, such a last channel in the list is followed by the first channel in the list, which can allow the user to continue scrolling without interruption.

Figure 6:
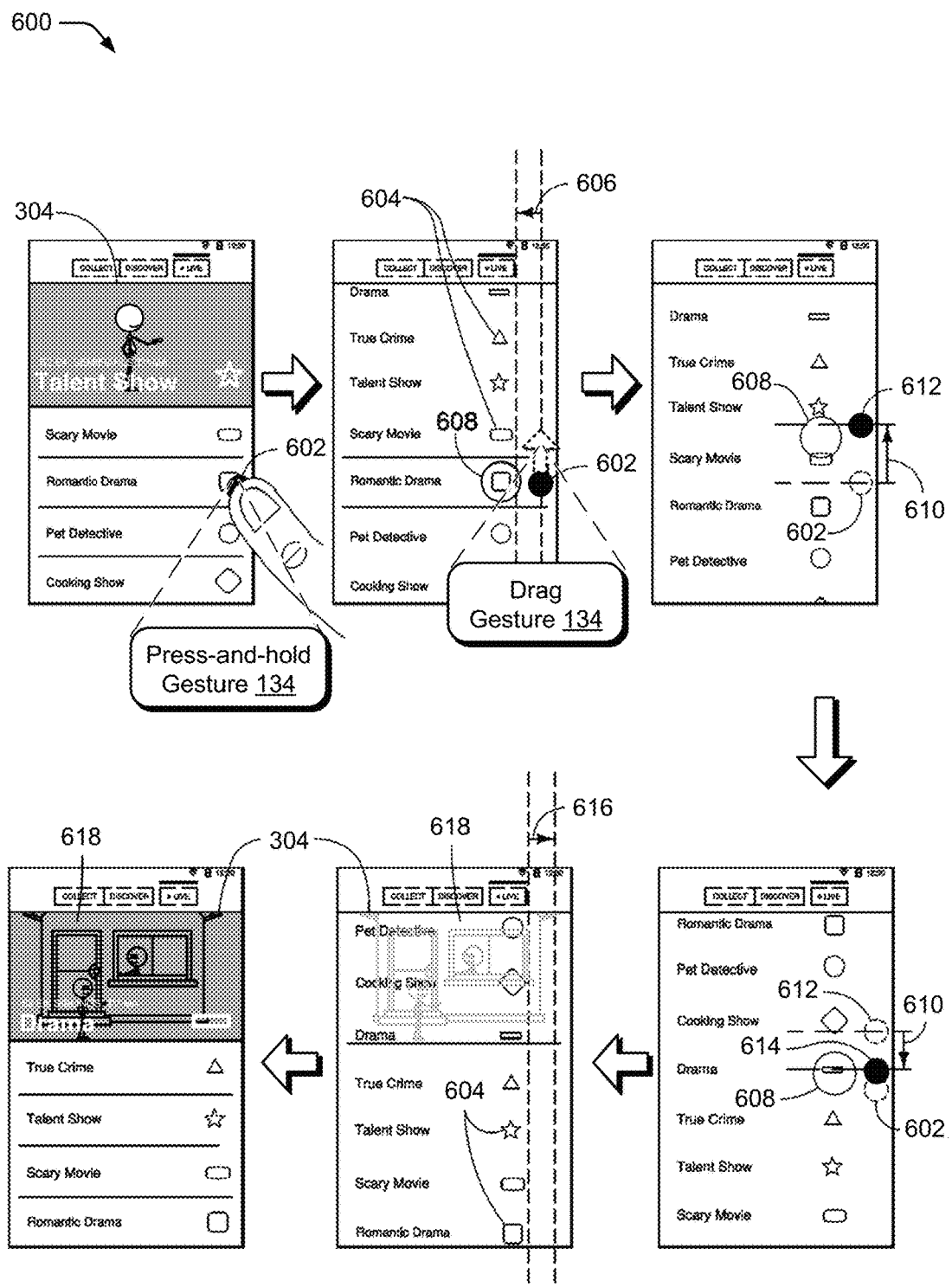
FIG. 6 illustrates an example implementation of fast scrolling the EPG with expanding cells for video preview.

FIG. 6 illustrates an example implementation 600 of fast scrolling the EPG with expanding cells for video preview in accordance with one or more aspects. Continuing with the preview example of the EPG 140, the user touches the surface of the display device 132 of the mobile computing device 102, such as at initial location 602 corresponding to a channel logo, and maintains contact with the surface for a duration of time. The mobile computing device 102 recognizes this touch input as the press-and-hold gesture 138. In response to recognizing the press-and-hold gesture, a scrolling mode is initiated in which the list of cells can be quickly scrolled in one or more directions based on additional input. In addition, channel logos 604 are moved inwards (e.g., toward a center of the display device 132 as indicated by arrow 606) so as to not be obscured by the user's finger. In some instances, shifting the channel logos 604 away from the initial touch location can prevent one or more of the channel logos 604 from being obscured by in input item (e.g., finger, stylus) used to perform the press-and-hold gesture 138. In addition, one of the channel logos (e.g., square logo) becomes focused, such as by having a circle 608 displayed around it. This focused channel logo represents a currently selected channel. Also, a display of the preview region 304 is removed and replaced with additional cells from the list of cells. In implementations, the preview region 304 is faded out and the additional cells are faded into view.

Then, while maintaining contact with the surface of the display device 132 and during the scrolling mode, the user slides his finger up or down. As the touch input begins to slide away from the initial location 602, the list of cells begins to scroll. For example, the touch input moves upwards by a measurable distance 610 and is held at a new location 612. This change in position of the touch input causes the list of cells to scroll down, revealing new cells at the top of the list. Visually, the user perceives his finger moving up the list of cells. As the distance 610 from the initial location 602 of the touch input to the new location 612 is increased, a scrolling speed of the list of cells also increases. In at least some implementations, the increase in scrolling speed can be proportional to the increase in the distance 610 between the initial location 602 and the new location 612. However, any suitable relationship between the scrolling speed and the distance 610 can be utilized. As each cell passes by the focus (e.g., circle 608), its corresponding program title and channel logo are highlighted, whereas other program titles and channel logos in other cells are faded. Although the illustrated example describes the touch input moving upwards, the user may move the touch input downwards to scroll the list in the opposite direction.

Then, the user may move his finger back toward the initial location 602, such as to location 614. In response to the touch input moving back toward the initial location 602, the scrolling speed decreases and a channel logo becomes focused (e.g., selected) within the circle 608. If at this point, the user lifts his finger from the surface of the display device 132, thereby causing an interrupt in the gesture, then the scrolling mode is ended, the channel logos 604 are moved outward back toward their original x-axis positions (indicated by arrow 616), the preview region 304 is brought back into view. Additionally, in the preview region 304 is displayed an image of a program corresponding to the channel logo that was selected when the scrolling ceased, such as a nearest-displayed channel to a most-recent touch location. Here, a rectangle channel logo is selected using the circle 608 when scrolling ceases. Further, when the touch input is interrupted by the user lifting his finger, the preview region 304 is faded into view with an image 618 corresponding to a Drama television program. As described above, after a predefined duration of time, the image 618 transitions into video of the Drama television program to allow the user to view real-time program content.

This fast scrolling technique described in relation to FIG. 6 may be useful when navigating through a large number of channels in the list of cells. Using these techniques, the user can quickly and easily scan across the channels. Further, these techniques solve the problem of requiring the user to perform a single swipe every time he wishes to move from the top of the list to the bottom of the list. When the user releases his finger (e.g., the user's finger is removed from contact with the surface of the mobile computing device 102), a selected channel is brought into focus and a corresponding piece of content begins to play in the preview region 304.

Figure 7:
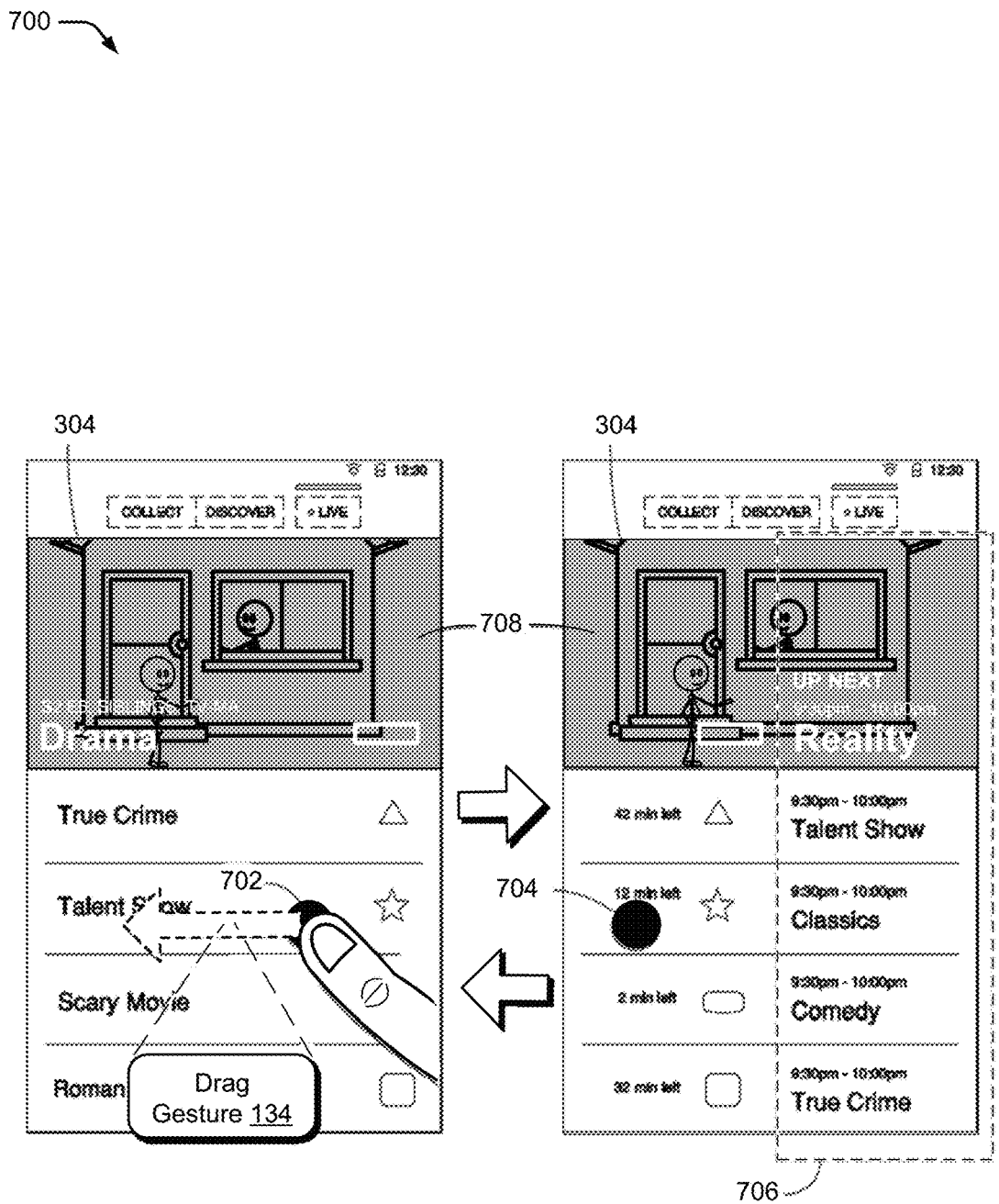
FIG. 7 illustrates an example implementation of viewing future scheduled programs via the EPG with expanding cells for video preview.

FIG. 7 illustrates an example implementation 700 of viewing future scheduled programs via the EPG with expanding cells for video preview in accordance with one or more aspects. Because of limited display area, the list of cells may only include current programs. However, the user can still have access to information regarding upcoming programs that are scheduled at a future time and past programs that have previously aired. To view upcoming program information, the user may touch the surface of the display device 132 at a location other than the channel logo, such as location 702, and drag the list of cells to one side. In the illustrated example, the user drags the list of cells to the left (e.g., from location 702 to location 704). The mobile computing device 102 recognizes this touch input as the drag gesture 136. In response to recognizing the drag gesture 136, the list of cells shifts in a corresponding direction (e.g., left) and reveals a new column 706 of cells each representing programs scheduled for a next time block on each of the channels in view. In the illustrated example, the column 706 represents upcoming programs for a 9:30 pm-10:00 pm time block. These upcoming programs include programs that are to be available via channels corresponding to cells from the list of cells that are in view. In addition, a video 708 displayed in the preview region 304 can continue playing while the mask over the video 708 is shifted to the side to reveal metadata describing an upcoming program on the particular channel in focus in the preview region 304. Here, a Reality program is shown as being up next on the current channel while the video 708 of the Drama program continues playing in the preview region 304.

The user may then drag his finger up or down to scroll the list of cells including the new column 706 and view other upcoming programs scheduled on other channels in the list. Because the upcoming programs are not yet available, the user may not be able to select one for playback. Accordingly, when the user releases his finger, the list of cells can spring back to display just the current programs. For example, the list of cells shifts to the right to push the column 706 of upcoming programs off the display and the current programs are brought back into view.

If a drag gesture is recognized in an opposing direction, the list of cells can shift to reveal one or more columns of previous time blocks with programs that have previously aired. Accordingly, the user can navigate the EPG 140 according to available channels in a vertical list of cells with time progressing from left to right. However, other arrangements and directions are also contemplated for the EPG 140.

Figure 8:
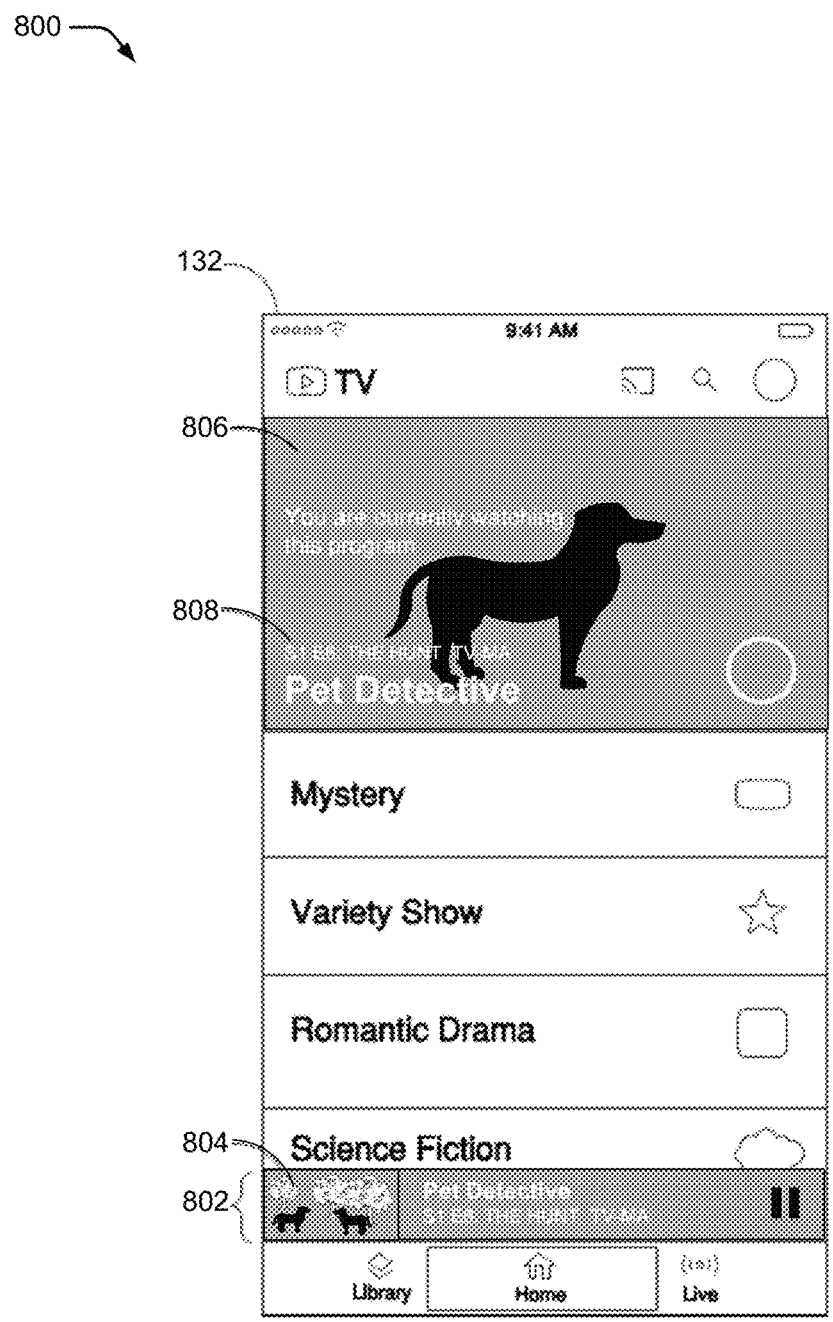
FIG. 8 illustrates an example implementation of a minimized media player for playing content via the EPG guide with expanding cells for video preview.

FIG. 8 illustrates an example implementation 800 of a minimized media player for playing content via the EPG with expanding cells for video preview. The local player can be minimized and positioned at a particular location on the display device 132. In the example illustration, a minimized the local player 802 is located near a bottom of the display device 132 and is playing real-time video of a currently selected program 804. By minimizing the local player 802, the user can view the list of cells, including an image 806 and metadata 808 of the program currently being played by the minimized local player 802. In at least one implementation, while the minimized local player 802 is playing the currently selected program 804, the user can continue browsing of the list of cells to preview information associated with other channels or programs represented by the cells.

Example Methods

Figure 9:
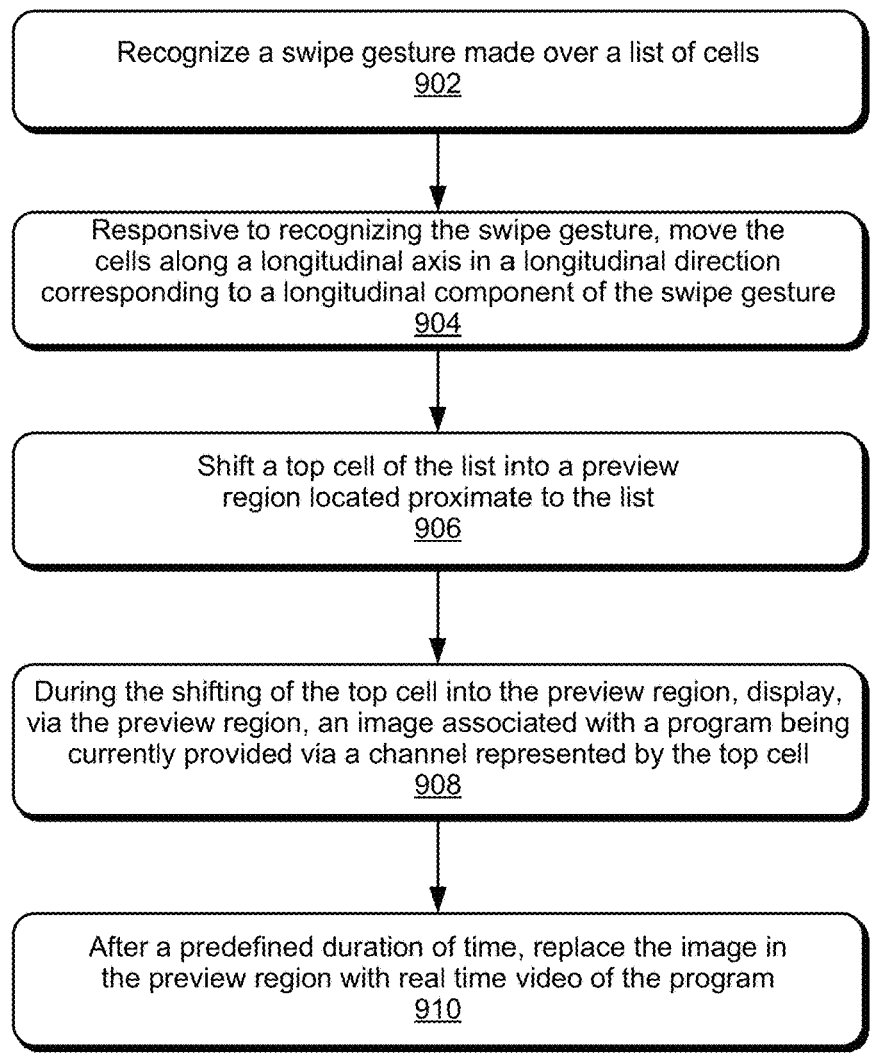
FIG. 9 illustrates example methods of navigating an EPG with expanding cells for video preview.
Figure 10:
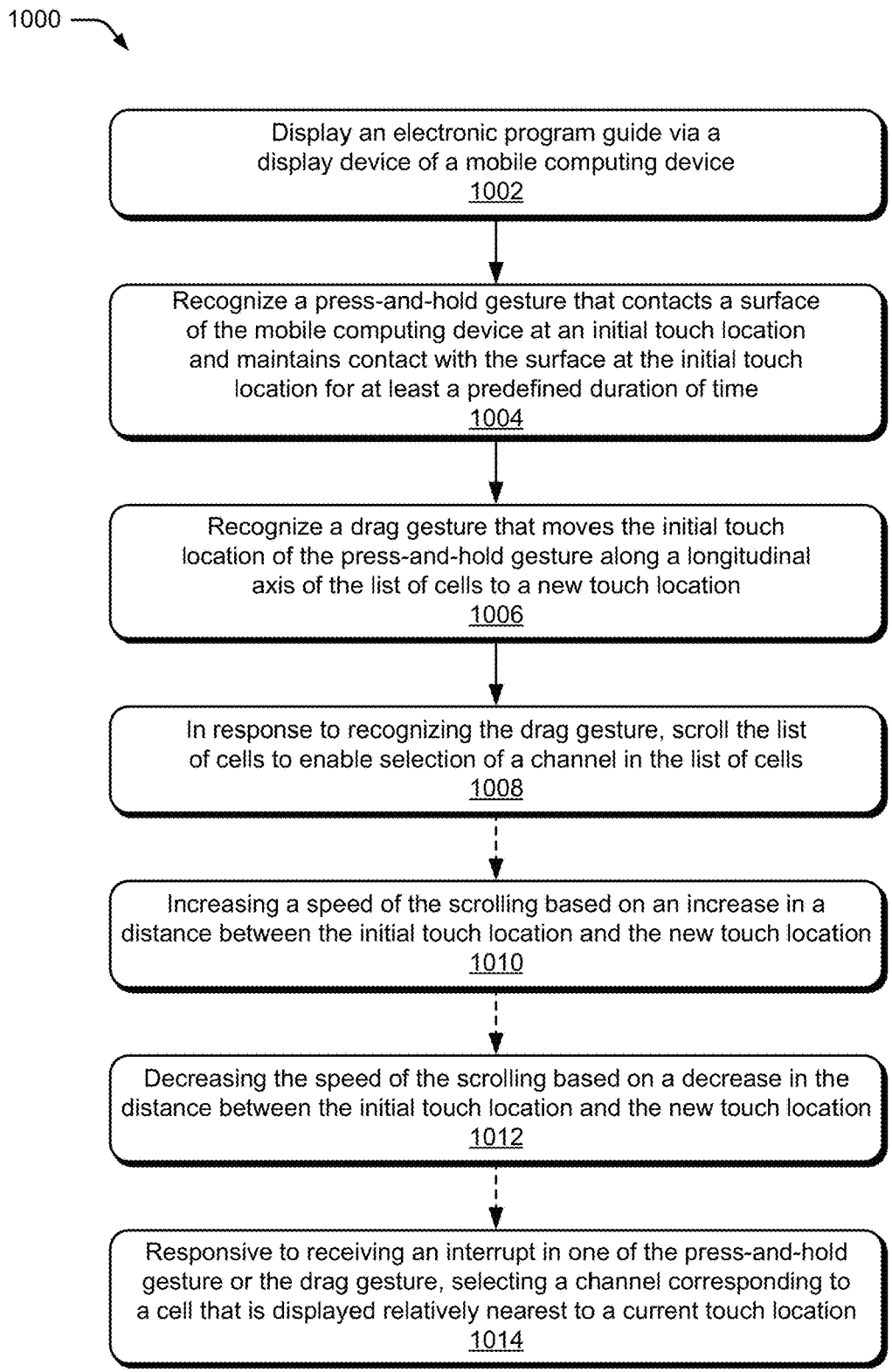
FIG. 10 illustrates example methods of fast scrolling an EPG with expanding cells for video preview.

The following discussion describes methods by which techniques are implemented to enable use of methodologies for an EPG with expanding cells for video preview. These methods can be implemented utilizing the previously described environment and example systems, devices, and implementations, such as shown in FIGS. 1-8. Aspects of these example methods are illustrated in FIGS. 9-11, which are shown as operations performed by one or more entities. The orders in which operations of these methods are shown and/or described are not intended to be construed as a limitation, and any number or combination of the described method operations can be combined in any order to implement a method, or an alternate method.

FIG. 9 illustrates example methods 900 of navigating an EPG with expanding cells for video preview in accordance with one or more aspects. At 902, a swipe gesture is recognized that is made over a list of cells. In one or more aspects, the swipe gesture includes a longitudinal component corresponding to a longitudinal axis of the list. In at least one implementation, the swipe gesture is recognized as a touch input that slides across a surface of the mobile computing device 102 in a direction corresponding to the longitudinal axis of the list. The swipe gesture can push the list in a direction toward a preview region or pull the list away from the preview region.

At 904, in response to the swipe gesture being recognized, the cells are moved along the longitudinal axis in a longitudinal direction corresponding to a longitudinal component of the swipe gesture. For example, the list of cells moves upward if the swipe gesture is directed substantially upward, and the list moves downward if the swipe gesture is substantially directed downward.

At 906, a top cell of the list is shifted into a preview region located proximate to the list. In at least one implementation, the top cell of the list is shifted such that it appears to move into or behind the preview region if the list of cells move upward. If, however, the list moves downward, then a new cell may appear to move out from behind the preview region to join the list at the top. At 908, during the shifting of the top cell into the preview region, an image associated with a program being currently provided via a channel represented by the top cell is displayed via the preview region.

At 910, after a predefined duration of time, the image in the preview region is replaced with real time video of the program. For example, after the image is displayed for approximately one (1) second, the image can fade out and the real time video of the program can fade in to provide a video preview of the program to the user.

FIG. 10 illustrates example methods 1000 of fast scrolling an EPG with expanding cells for video preview in accordance with one or more aspects. At 1002, a portion of an electronic programming guide is displayed via a touch display of a mobile computing device. At 1004, a press-and-hold gesture is recognized that contacts a surface of the touch display at an initial touch location and maintains contact with the surface at the initial touch location for at least a predefined duration of time.

At 1006, a drag gesture is recognized that moves the initial touch location of the press-and-hold gesture along a longitudinal axis of the list of cells to a new touch location. In at least one aspect, the press-and-hold gesture and the drag gesture are recognized as a continuous touch input without interruption. At 1008, in response to recognizing the drag gesture, the list of cells is scrolled in a longitudinal direction along the longitudinal axis of the list to enable selection of a channel in the list of cells that was not included in the displayed portion of the EPG. In at least one aspect, the list is scrolled continuously during the drag gesture.

At 1010, a speed of the scrolling is increases based on an increase in a distance between the initial touch location and the new touch location. At 1012, the speed of the scrolling is decreased based on a decrease in the distance between the initial touch location and the new touch location. At 1014, responsive to receiving an interrupt in one of the press-and-hold gesture or the drag gesture, a channel corresponding to a cell that is displayed relatively nearest to a current touch location is selected to initiate a display of corresponding program content represented by the selected cell.

FIG. 11 illustrates example methods 1100 of viewing upcoming programs via an EPG with expanding cells for video preview in accordance with one or more aspects. At 1102, an EPG is displayed that includes a plurality of cells representing media programs currently being provided via media channels and a preview region configured to display media content associated with a first media program being currently provided via a first channel.

At 1104, a drag gesture is recognized over the plurality of cells. At 1106, in response to recognizing the drag gesture, the plurality of cells is shifted along a horizontal axis of the list in a horizontal direction corresponding to a horizontal component of the drag gesture. At 1108, in response to the plurality of cells being shifted, a column of cells is displayed that represents upcoming programs that are scheduled for a future time on the channels represented by the plurality of cells. For example, a new column of cells can be displayed when the cells are shifted, and the new column can represent the upcoming programs.

At 1110, in response to receiving an interrupt during the drag gesture, returning the plurality of cells to respective positions of the plurality of cells prior to being shifted. For example, the cells are shifted to remove the new column from the display such that only the current programs are then displayed.

These methodologies allow a user to navigate an EPG via a mobile computing device in an easy and efficient manner. Using these techniques, the user can preview real time video of current programs simply by swiping or dragging his finger along the gesture-sensitive surface of the mobile computing device. Further, the user can use the mobile computing device as a remote controller for a remote computing device, and preview the real time video of current programs without interrupting content playing at the remote computing device or initiate a channel change at the remote device to tune to a channel being previewed at the mobile computing device.

Example Electronic Device

Figure 12:
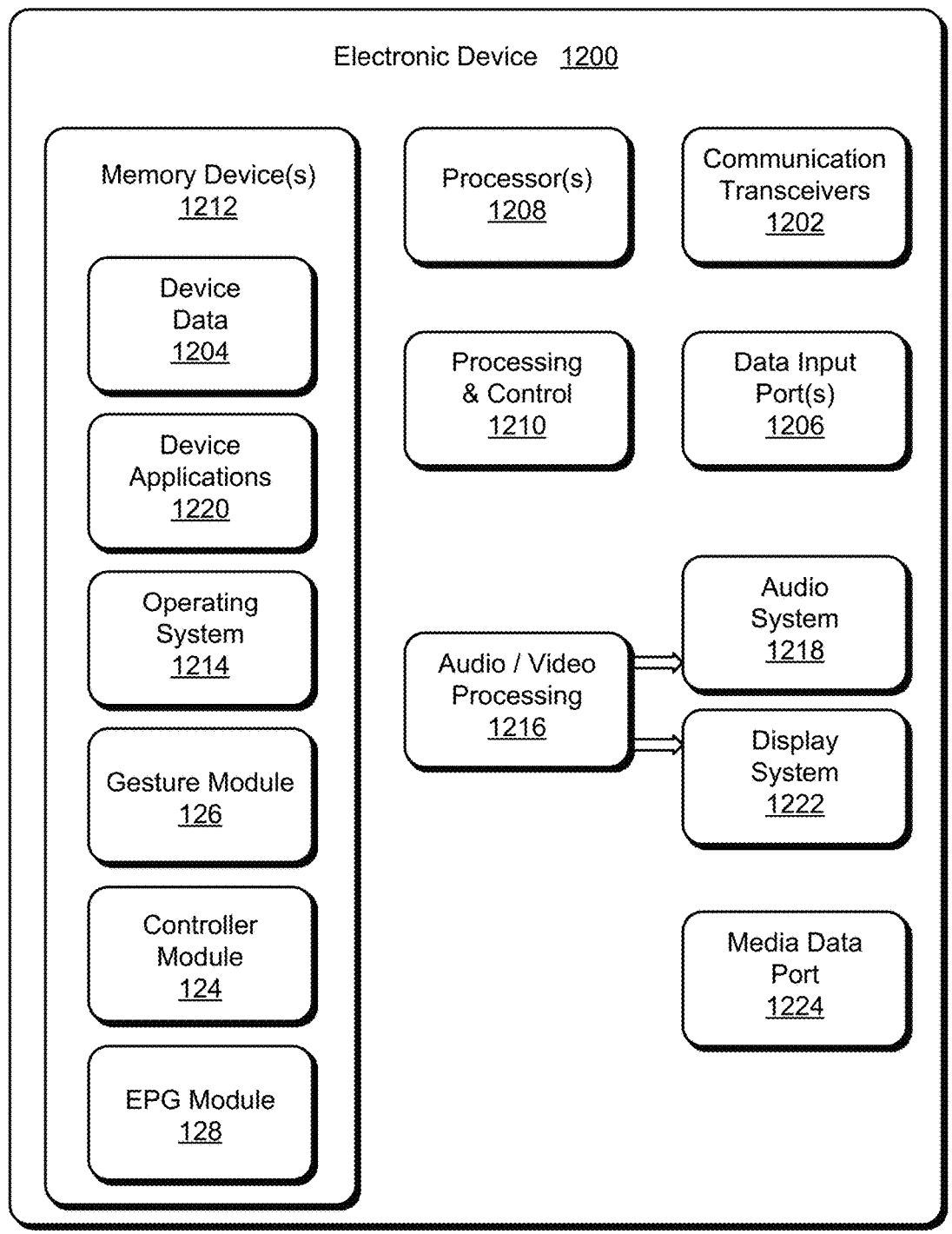
FIG. 12 illustrates various components of an electronic device that can implement methodologies for an EPG with expanding cells for video preview.

FIG. 12 illustrates various components of an example electronic device 1200 that can be utilized to implement an EPG with expanding cells for video preview as described with reference to any of the previous FIGS. 1-11. The electronic device may be implemented as any one or combination of a fixed or mobile device, in any form of a consumer, computer, portable, user, communication, phone, navigation, gaming, audio, camera, messaging, media playback, and/or other type of electronic device, such as computing device 102 described with reference to FIGS. 1 and 2.

Electronic device 1200 includes communication transceivers 1202 that enable wired and/or wireless communication of device data 1204, such as received data, transmitted data, or sensor data as described above. Example communication transceivers include NFC transceivers, WPAN radios compliant with various IEEE 802.15 (Bluetooth™) standards, WLAN radios compliant with any of the various IEEE 802.11 (WiFi™) standards, WWAN (3GPP-compliant) radios for cellular telephony, wireless metropolitan area network (WMAN) radios compliant with various IEEE 802.16 (WiMAX™) standards, and wired local area network (LAN) Ethernet transceivers.

Electronic device 1200 may also include one or more data input ports 1206 via which any type of data, media content, and/or inputs can be received, such as user-selectable inputs, messages, music, television content, live streaming content, recorded video content, and any other type of audio, video, and/or image data received from any content and/or data source (e.g., other video devices). Data input ports 1206 may include USB ports, coaxial cable ports, and other serial or parallel connectors (including internal connectors) for flash memory, DVDs, CDs, and the like. These data input ports may be used to couple the electronic device to components, peripherals, or accessories such as keyboards, microphones, or cameras.

Electronic device 1200 of this example includes processor system 1208 (e.g., any of application processors, microprocessors, digital-signal-processors, controllers, and the like), or a processor and memory system (e.g., implemented in a SoC), which process (e.g., execute) computer-executable instructions to control operation of the device. Processor system 1208 may be implemented as an application processor, embedded controller, microcontroller, and the like. A processing system may be implemented at least partially in hardware, which can include components of an integrated circuit or on-chip system, digital-signal processor (DSP), application-specific integrated circuit (ASIC), field-programmable gate array (FPGA), a complex programmable logic device (CPLD), and other implementations in silicon and/or other hardware.

Alternatively or in addition, electronic device 1200 can be implemented with any one or combination of software, hardware, firmware, or fixed logic circuitry that is implemented in connection with processing and control circuits, which are generally identified at 1210 (processing and control 1210).

Although not shown, electronic device 1200 can include a system bus, crossbar, or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Electronic device 1200 also includes one or more memory devices 1212 that enable data storage, examples of which include random access memory (RAM), non-volatile memory (e.g., read-only memory (ROM), flash memory, EPROM, EEPROM, etc.), and a disk storage device. Memory device(s) 1212 provide data storage mechanisms to store the device data 1204, other types of information and/or data, and various device applications 1220 (e.g., software applications). For example, operating system 1214 can be maintained as software instructions within memory device 1212 and executed by processors 1208. In some aspects, gesture module 126, controller module 124, and EPG module 128 are embodied in memory devices 1212 of electronic device 1200 as executable instructions or code. Although represented as a software implementation, gesture module 126, controller module 124, and EPG module 128 may be implemented as any form of a control application, software application, signal-processing and control module, or hardware or firmware installed on the electronic device 1200.

Electronic device 1200 also includes audio and/or video processing system 1216 that processes audio data and/or passes through the audio and video data to audio system 1218 and/or to display system 1222 (e.g., a screen of a smart phone or camera). Audio system 1218 and/or display system 1222 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1224. In some implementations, audio system 1218 and/or display system 1222 are external components to electronic device 1200. Alternatively or additionally, display system 1222 can be an integrated component of the example electronic device, such as part of an integrated touch interface.

Although aspects of methodologies for an electronic programming guide with expanding cells for video preview have been described in language specific to features and/or methods, the subject of the appended claims is not necessarily limited to the specific features or methods described. Rather, the specific features and methods are disclosed as example implementations of an electronic programming guide with expanding cells for video preview.

What is claimed is:

1. A method implemented by a mobile computing device, the method comprising:
    displaying a list of cells concurrently with a preview region located proximate to the list, the list of cells including one or more expanding cells for video preview and representing media channels currently airing video of programs in real time;
    recognizing a swipe gesture made over the list of cells;
    responsive to recognizing the swipe gesture, moving the cells along a longitudinal axis of the list in a longitudinal direction corresponding to a longitudinal component of the swipe gesture;
    providing visual feedback for the swipe gesture by shifting a top cell of the list into the preview region, the preview region having a larger area than the top cell, the preview region configured to display media content associated with a currently selected channel, the shifting including visually expanding and transitioning the top cell into an image displayable in the preview region;
    during the shifting of the top cell into the preview region, displaying the image via the preview region, the image associated with a program being currently provided via a channel represented by the top cell, the displaying of the image including:
        transitioning the displayed media content out of the preview region and revealing a display of the image as the top cell visually moves into or behind the preview region; and
        masking text displayed in the top cell as a semitransparent mask over the image as the display of the image is revealed in the preview region to enable the image to be viewable through the semitransparent mask;
    after a predefined duration of time, replacing the image in the preview region with real-time video of the program being currently provided via the channel represented by the top cell;
    receiving a user input that selects the real-time video being displayed in the preview region; and
    responsive to the user input that selects the real-time video being displayed in the preview region, communicating a control command to a remote computing device to cause the remote computing device to tune to the channel corresponding to the real-time video.

2. A method as described in claim 1, further comprising:
    recognizing a drag gesture made over the list, the drag gesture recognized as a touch input that horizontally moves to one side of a display device of the mobile computing device; and
    responsive to recognizing the drag gesture, horizontally moving the cells in a horizontal direction that is substantially perpendicular to the longitudinal axis of the list and displaying information associated with one or more upcoming programs that are scheduled for a future time on each channel corresponding to the cells.

3. A method as described in claim 2, further comprising, responsive to receiving an interrupt during the drag gesture, removing the information associated with the one or more upcoming programs, and returning the cells in the list to positions at which the cells were located prior to being horizontally moved.

4. A method as described in claim 1, further comprising:
    based on a velocity of the swipe gesture exceeding a threshold value, scrolling the list of cells effective to cause a plurality of the cells to visually pass through the preview region along with corresponding images of programs represented by the plurality of the cells; and
    decreasing a speed of the scrolling of the list until the scrolling ceases and the image associated with the program being currently provided via a channel represented by the top cell is displayed.

5. A method as described in claim 4, further comprising displaying the semitransparent mask over the image in the preview region when a movement speed of an input item used to perform the swipe gesture is below a threshold value.

6. A method as described in claim 1, wherein the list of cells is part of an electronic programming guide displayed in a portrait layout.

7. A method as described in claim 1, further comprising removing the top cell from the list and displaying a next cell at the top of the list, the next cell corresponding to an additional program being provided via an additional channel.

8. A method as described in claim 1, wherein:
    each cell includes a program title for a respective program being currently provided via a corresponding channel of the media channels; and
    the program title is parallaxed when transitioning from the list to the preview region.

9. A method as described in claim 1, wherein the image in the preview region is replaced by fading out the image and fading in the real-time video.

10. A mobile device comprising:
a touch screen;
at least one computer-readable storage media storing instructions as an electronic programming guide (EPG) module; and
at least one processor configured to execute the instructions to implement the EPG module configured to provide access to an electronic programming guide comprising:
a list of cells representing current media programs and corresponding channels, the list of cells representing media channels currently airing video of programs in real time, the list of cells including one or more expanding cells for video preview; and
a preview region configured to display media content associated with a first media program being currently provided via a currently-selected channel;
the at least one processor configured to execute the instructions to, based on a navigation input:
recognize a swipe gesture made over the list of cells;
in response to recognition of the swipe gesture, move the cells along a longitudinal axis of the list in a longitudinal direction corresponding to a longitudinal component of the swipe gesture;
shift a top cell of the list into the preview region to provide visual feedback for the swipe gesture that includes the top cell visually moving into or behind the preview region, the preview region having a larger area than the top cell, the shift of the top cell into the preview region including a visual expansion and transition of the top cell into an image displayable in the preview region, the image associated with a program being currently provided via a channel represented by the top cell;
as the top cell visually moves into or behind the preview region, transition the media content associated with the first media program out of the preview region and reveal a display of the image,
if a velocity of the swipe gesture is detected as being less than a threshold value, generate a semitransparent mask for display over the image as the display of the image is revealed in the preview region to enable the image to be viewable through the semitransparent mask, the semitransparent mask including text displayed in the top cell;
if the velocity of the swipe gesture is detected as being greater than the threshold value, provide the display of the image in the preview region without the semitransparent mask; and
after a predetermined duration of time, replace the image in the preview region with real-time video of the program.

11. A mobile device as described in claim 10, wherein the semitransparent mask includes at least a title of the program or a channel logo of the channel represented by the top cell.

12. A mobile device as described in claim 10, wherein the at least one processor is configured to execute the instructions further to:
recognize a drag gesture made over the list of cells, the drag gesture recognized as a touch input that horizontally moves to one side of a display device of the mobile computing device; and
responsive to recognition of the drag gesture, horizontally move the cells in a horizontal direction that is substantially perpendicular to the longitudinal axis of the list and display information associated with one or more upcoming programs that are scheduled for a future time on each channel corresponding to the cells.

13. A mobile device as described in claim 12, wherein the at least one processor is configured to execute the instructions further to:
responsive to an interrupt being received during the drag gesture, remove the information associated with the one or more upcoming programs, and returning the cells in the list to positions at which the cells were located prior to being horizontally moved.

14. A mobile device as described in claim 10, wherein the at least one processor is configured to execute the instructions further to:
based on the velocity of the swipe gesture exceeding the threshold value, scrolling the list of cells effective to cause the cells to visually pass through the preview region along with corresponding images of programs represented by the plurality of the cells; and
decreasing a speed of the scrolling of the list until the scrolling ceases and another image associated with another program is displayed in the preview region, the other program being currently provided via another channel represented by another cell from the list of cells that is a last cell to visually move into or behind the preview region.

15. A mobile device as described in claim 10, wherein the list of cells is part of an electronic programming guide displayed in a portrait layout.

16. A mobile device as described in claim 10, wherein the at least one processor is configured to execute the instructions further to remove the top cell from the list and display a next cell at a top of the list, the next cell corresponding to an additional program being provided via an additional channel.

17. A mobile device as described in claim 10, wherein:
each cell includes a program title for a respective program being currently provided via a corresponding channel of the media channels; and
the program title is parallaxed when transitioning from the list to the preview region.

18. A method implemented by a mobile computing device, the method comprising:
displaying a list of cells concurrently with a preview region located proximate to the list, the list of cells including one or more expanding cells for video preview and representing media channels currently airing video of programs in real time;
recognizing a swipe gesture made over the list of cells;
responsive to recognizing the swipe gesture, moving the cells along a longitudinal axis of the list in a longitudinal direction corresponding to a longitudinal component of the swipe gesture;
providing visual feedback for the swipe gesture by shifting a top cell of the list into the preview region, the preview region having a larger area than the top cell, the preview region configured to display media content associated with a currently selected channel, the shifting including visually expanding and transitioning the top cell into an image displayable in the preview region;
during the shifting of the top cell into the preview region, displaying the image via the preview region, the image associated with a program being currently provided via a channel represented by the top cell, the displaying of the image including:

transitioning the displayed media content out of the preview region and revealing a display of the image as the top cell visually moves into or behind the preview region; and masking text displayed in the top cell as a semitransparent mask over the image as the display of the image is revealed in the preview region if a velocity of the swipe gesture is detected as being less than a threshold value, the display of the image revealed without the semitransparent mask if the velocity of the swipe gesture is detected as being greater than the threshold value; and after a predefined duration of time, replacing the image in the preview region with real-time video of the program being currently provided via the channel represented by the top cell.

19. A method as described in claim 18, further comprising:

recognizing a drag gesture made over the list, the drag gesture recognized as a touch input that horizontally moves to one side of a display device of the mobile computing device; and responsive to recognizing the drag gesture, horizontally moving the cells in a horizontal direction that is substantially perpendicular to the longitudinal axis of the list and displaying information associated with one or more upcoming programs that are scheduled for a future time on each channel corresponding to the cells.

20. A method as described in claim 18, further comprising:

based on the velocity of the swipe gesture being greater than the threshold value, scrolling the list of cells effective to cause a plurality of the cells to visually pass through the preview region along with corresponding images of programs represented by the plurality of the cells; and decreasing a speed of the scrolling of the list until the scrolling ceases and another image associated with another program is displayed in the preview region, the other program being currently provided via another channel represented by another cell from the list of cells that is a last cell to visually move into or behind the preview region.

* * * * *